US 6,542,753 B1

(12) United States Patent
Swenson

(10) Patent No.: US 6,542,753 B1
(45) Date of Patent: Apr. 1, 2003

(54) GAIN CONTROL FOR MULTI-CHANNEL FIXED WIRELESS TERMINAL

(75) Inventor: John Anthony Swenson, Fort Collins, CO (US)

(73) Assignee: Motorola, Inc., Schaumburg, IL (US)

( * ) Notice: Subject to any disclaimer, the term of this patent is extended or adjusted under 35 U.S.C. 154(b) by 409 days.

(21) Appl. No.: 09/676,309

(22) Filed: Sep. 30, 2000

(51) Int. Cl.[7] .............................. H04Q 7/26; H04B 7/00; H04M 9/00; H05H 1/00
(52) U.S. Cl. ..................... 455/462; 455/522; 455/69; 455/422; 455/561; 455/557; 379/60; 379/61; 379/57; 379/201
(58) Field of Search ..................... 455/522, 69, 462, 455/422, 561, 556, 557, 554–555; 379/60–61, 57, 201, 94, 156, 355, 56.1–56.2, 56.3

(56) References Cited

U.S. PATENT DOCUMENTS

| 5,724,656 A | * | 3/1998 | Vo et al. ..................... 455/422 |
| 5,930,727 A | * | 7/1999 | Henry, Jr. ................... 455/557 |
| 5,937,342 A | * | 8/1999 | Kline .......................... 455/402 |
| 6,324,410 B1 | * | 11/2001 | Giacopelli et al. .......... 455/554 |
| 6,466,799 B1 | * | 10/2002 | Torrey et al. ................ 455/462 |

* cited by examiner

Primary Examiner—Vivian Chin
Assistant Examiner—Kamran Afshar

(57) ABSTRACT

A multi-channel fixed wireless terminal (14) is implemented using a gain controller (34) for controlling the gain of each of a plurality of transmission channels. The gain controller (34) includes an averager (62) for receiving and averaging gain control signals (58a–58d) for each of multiple transmission channels to generate an average gain control signal (48). In addition, differentiators (70a–70d) generate respective differential gain control signals (74a–74d) for the multiple transmission channels from the respective gain control signals (58a–58d) for the multiple transmission channels and the average gain control signal (48). A plurality of adjustable amplifiers (72a–72d) controlled by the respective plurality of differentiators (70a–70d) amplify signals transmitted over the multiple transmission channels and input thereto to maximize respective signal to noise ratios of the signals. Through implementation of the gain controller (34), the multi-channel fixed wireless terminal (14) may be implemented with only a single transmitter (38).

16 Claims, 4 Drawing Sheets

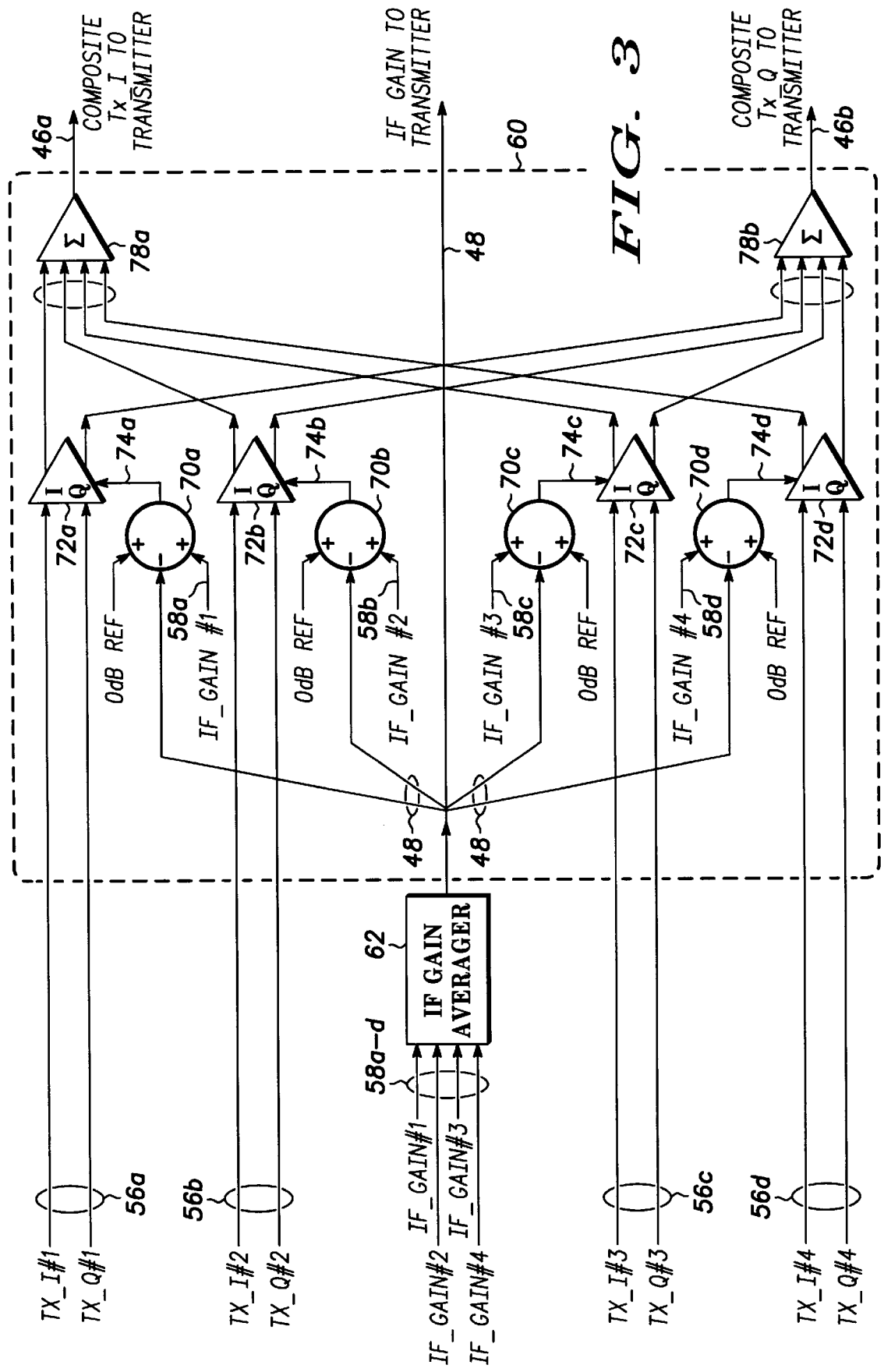

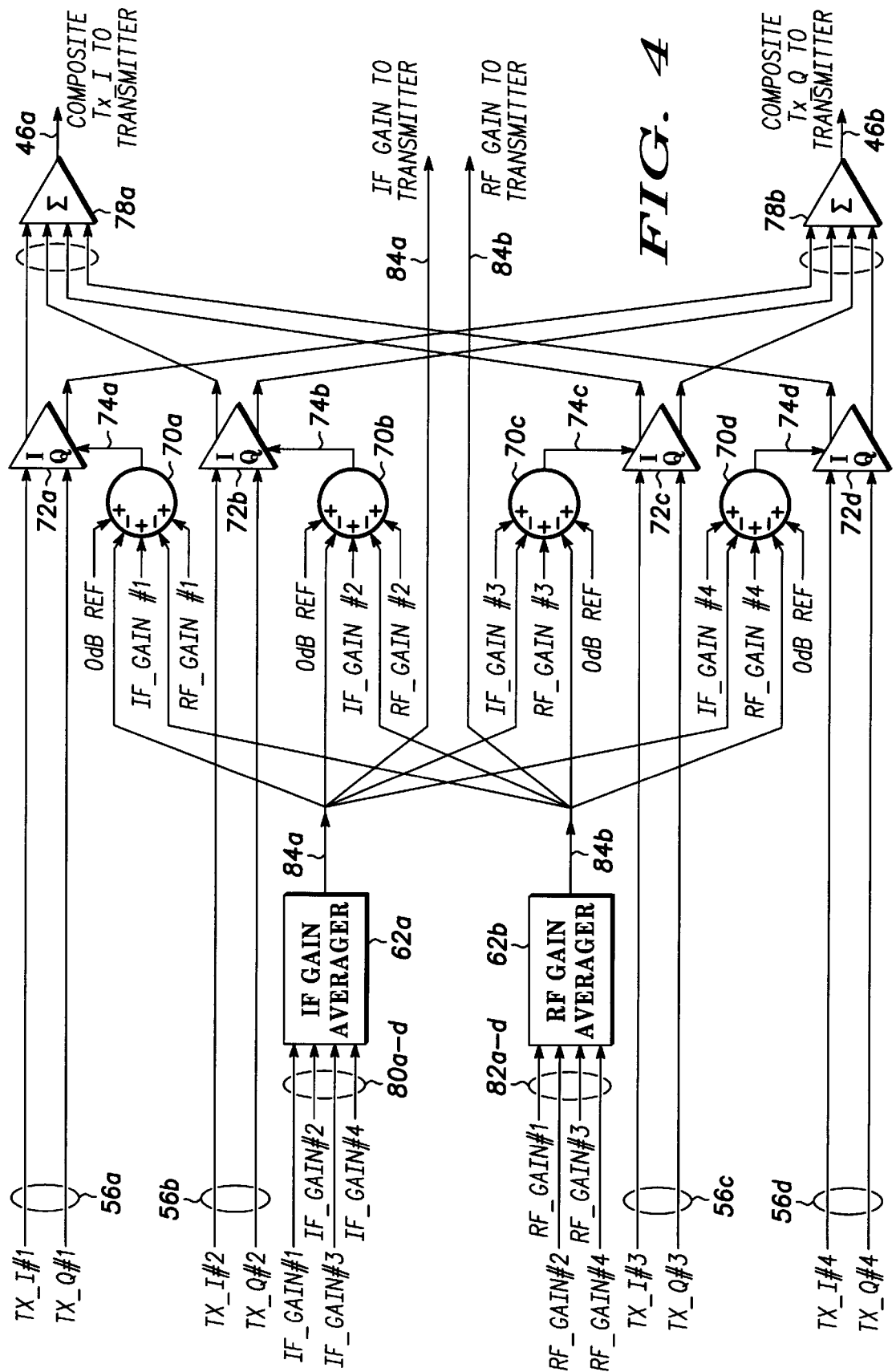

US 6,542,753 B1

GAIN CONTROL FOR MULTI-CHANNEL FIXED WIRELESS TERMINAL

BACKGROUND OF THE INVENTION

1. Field of the Invention

The present invention relates generally to wireless communications systems, and more particularly to channel power control in a fixed multi-line wireless terminal.

2. Description of Related Art

In many parts of the world, it is expensive or difficult to run copper wire or fiber optic cable to homes and businesses to provide local phone service. A wireless local loop telephone system enables service providers to service such areas without the need for cable and its associated costs.

In a wireless local loop system, telephones and other terminal equipment at a customer site are connected to a fixed wireless terminal (FWT). The fixed wireless terminal communicates with the public switched telephone network (PSTN) through a wireless radio link, thereby enabling basic telephone service to be provided to customers who would not otherwise have access to telecommunications services, at a fraction of the cost of a traditional wire line infrastructure. Because wireless local loop systems provide telecommunications system operators with the benefits of rapid deployment, large coverage area, large capacity, and lower operating and maintenance costs, digital wireless telephone networks may be deployed rapidly and economically in developing countries which lack sufficient land-line infrastructure.

In a multi-line fixed wireless terminal, multiple channel units share a common transmitter. The transmitter controls the transmit power of each channel unit based on power level commands received from the base station(s) servicing the FWT. More specifically, each individual channel unit provides the transmitter with a set of baseband I land Q modulation signals, as well as a power control signal to control the attenuation of the transmit power level of each individual channel unit.

Adjusting the power levels of the respective channel units in a multi-line FWT is problematic. One possible way to independently adjust the transmit power of each individual channel unit requires performing all power adjustments at baseband prior to combining the individual transmit baseband channels. However, with such an approach, if all individual channel units were requested to reduce their power to a minimum level, the signal to noise ratio would be reduced to unacceptably low levels.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a block diagram showing the components of a composite gain adjuster located within the multi-line fixed wireless terminal of FIG. 2 and of a preferred embodiment in accordance with the present invention; and FIG. 4 is a block diagram showing the components of a composite gain adjuster located within the multi-line fixed wireless terminal of FIG. 2 and of another preferred embodiment in accordance with the present invention.

DETAILED DESCRIPTION OF THE PREFERRED EMBODIMENTS

Figure 1:
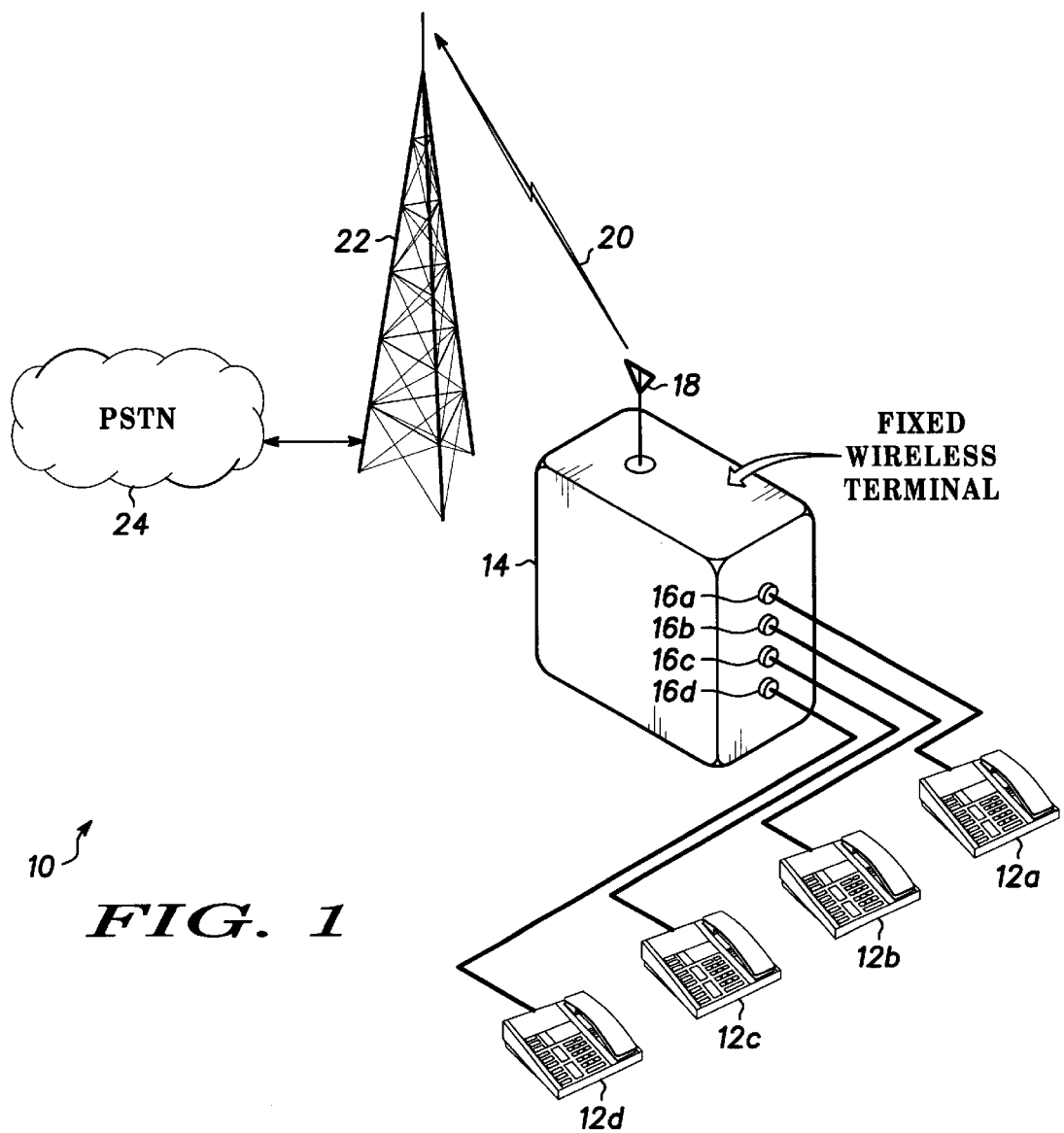
FIG. 1 is a block diagram of a wireless local loop telecommunications system of the type in which a multi-line fixed wireless terminal of an embodiment in accordance with the present invention is implemented.

Referring now to the drawings in which like numerals reference like parts, FIG. 1 shows a wireless local loop digital cellular communications system 10. As shown, terminal equipment units 12a–12d are coupled to a multi-line fixed wireless terminal (FWT) 14 at input ports 16a–16d. The terminal equipment units 12a–12d may be telephones, fax machines, modems, or other customer provided equipment, or customer premise equipment (CPE). The input ports 16a–16d are typically implemented with, for example, RJ-11 jacks or other jacks from the RJ family of jacks registered with the Federal Communications Commission, such as RJ-12 and RJ-45 jacks, or with other types of connectors, to connect, for example, a twisted-pair copper cable between the terminal equipment units 12a–12d and the fixed wireless terminal 14. While the embodiment shown in FIG. 1 shows four input ports 16a–16d, the number of input ports, and therefore channels available through the FWT 14, may vary.

The multi-line FWT 14 is coupled to an antenna 18 for transmitting radio frequency signals 20 to a base station 22, and is typically mounted in a convenient location in a building or home so that it remains fixed in relation to the location of base station 22. The radio frequency signals 20 ordinarily conform to an air interface standard, such as the industry standard IS-95 for code division multiple access (CDMA) cellular communications systems. The base station 22 ultimately communicates user voice or data signals to the public switched telephone network (PSTN) 24 after it receives signals from the FWT 14 so that customers using the telephones 12a–12d may place calls to other telephones connected to the PSTN 24.

In digital cellular communications systems, such as the system 10, it is desirable that each subscriber unit, such as the telephones 12a–12d, transmits signals to the base station 22 at the minimum power level required to ensure adequate reception of the signals at the base station, while simultaneously enhancing call quality by minimizing signal interference, maximizing system call capacity, and improving the life of the batteries in the respective telephones 12a–12d.

During a normal telephone call on the CDMA system 10, the base station 22 will instruct either the FWT 14 or the appropriate one of the subscriber units, such as the telephone 12a, at a rate of 800 times per second to adjust the transmit power of the subscriber unit using closed loop power control. The closed loop power control is automatically executed while a call is in progress to ensure that the base station 22 always receives signals from the subscriber unit at the desired signal level.

Figure 2:
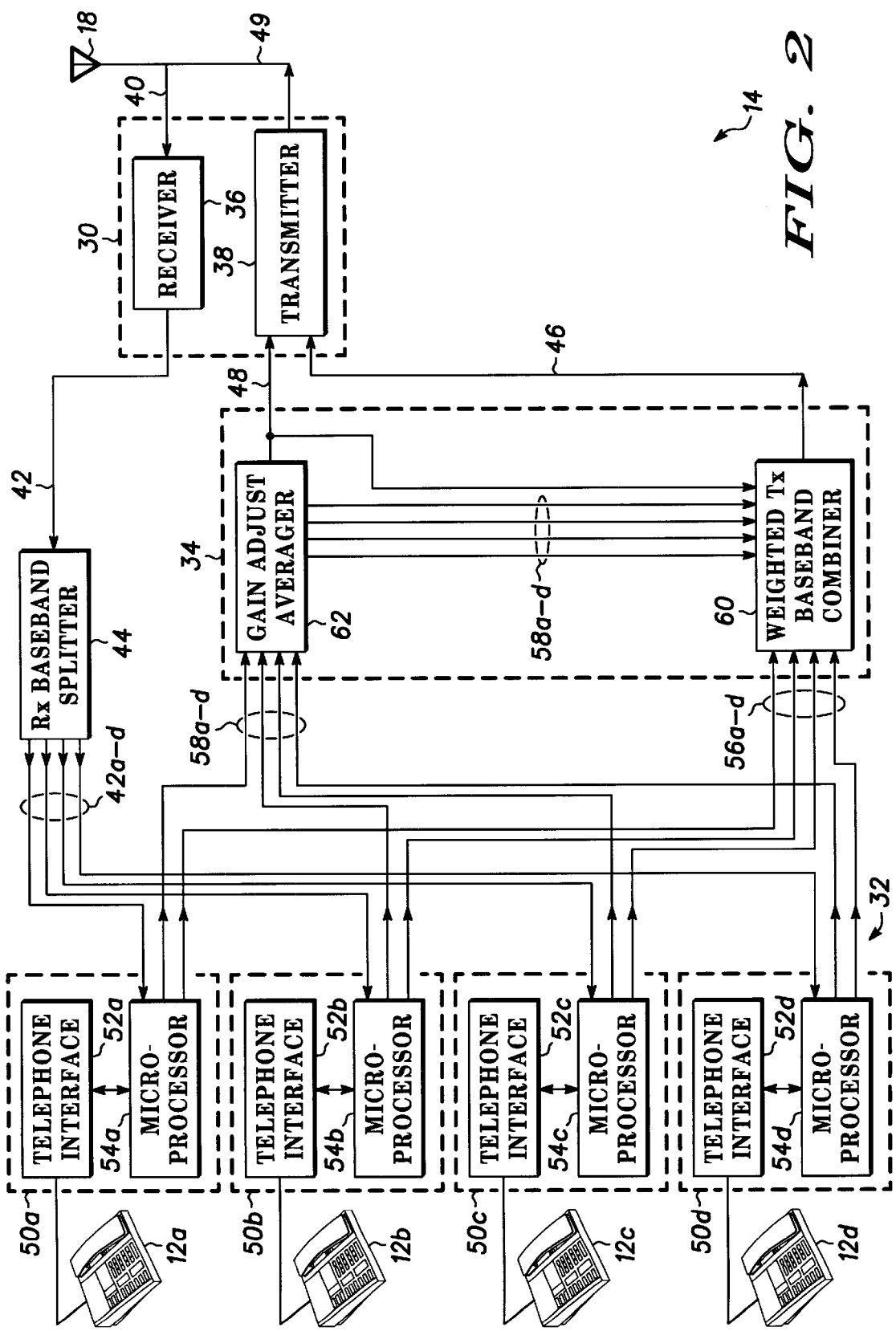
FIG. 2 is a block diagram showing the components of the multi-line fixed wireless terminal of FIG. 1 in more detail.

FIG. 2 shows the multi-line FWT 14 in more detail. The multi-line FWT 14 includes three main component sections: A Radio Frequency section 30, a digital section 32, and a composite gain adjust section 34. The RF section 30 contains RF components necessary for providing the wireless link between the telephones 12a–12d and the base station 14. Specifically, the RF section 30 includes a receiver 36 and a transmitter 38. The receiver 36 is for receiving a radio signal 40 from the base station 14 via the antenna 18, converting it into a baseband receive signal 42, and outputting the baseband receive signal 42 to a baseband splitter 44, which then splits the baseband receive signal into individual channel baseband receive signals 42a–42d that are each capable of being processed by the digital section 32.

The transmitter 38 is for accepting a composite baseband transmit signal 46 and a composite gain adjust signal 48 from the composite gain adjust section 34, converting these signals 46 and 48 into a transmit radio signal 49, and transmitting the transmit radio signal 49 to the base station 22 via the antenna 18 at a power level determined by the composite gain adjust section 34 in a manner to be described in more detail below.

The digital section 32 includes individual digital control sections 50a–50d for each of the respective telephones 12a–12d. The control sections 50a–50 d include respective telephone interfaces 52a–52d and microprocessors 54a–54d. The microprocessors 54a–54d are each for receiving a broadband receive signal, intended for a corresponding one of the telephones 12a–12d, from the receiver 36 via the splitter 44, converting the broadband receive signal to an audio signal, and transmitting the audio signal to a corresponding one of the telephone interfaces 52a–52d. Each of the microprocessors 54a–54d is also for receiving the audio signal transmitted from a telephone microphone from a corresponding one of the telephones 12a–12d, through a corresponding one of the telephone interfaces 52a–52d, and converting the received audio signals to baseband transmit signals 56a–56d with a fixed gain. Each of the generated baseband transmit signals 56a–56d is then transmitted to the composite gain adjust section 34 to be combined into a composite baseband transmit signal 46 for output to the transmitter 38.

In addition, the microprocessors 54a–54d in the digital section 32 are also for extracting power control request information present in the baseband receive signals 42a–42d, interpreting the information, and using the information to generate gain adjust signals 58a–58d that are input into the composite gain adjust section 34 for use in setting the gain for the transmitter 38 at a desired level to satisfy power control requests received from the base station 22.

The composite gain adjust section 34 according to the preferred embodiment enables the FWT 14 to support multiple telephone lines, also referred to in this description as channels, by enabling the single RF section 30 to be integrated with the multiple digital control sections 50a–50d. In the composite gain adjust section 34, a baseband transmit signal combiner 60 is for receiving the generated baseband transmit signals 56a–56d from the respective individual control sections 50a–50d, and generating the composite baseband transmit signal 46, which is input into the transmitter 38.

In addition, a composite gain averager 62, which can be realized through implementation of, for example, a simple opamp non-inverter averaging circuit, is for receiving the gain adjust signals 58a–58d from the individual control sections 50a–50d, and for generating the composite gain adjust signal input 48 for the transmitter 38. The composite gain adjust section 34 thereby enables the software of individual control sections, such as the control sections 50a–50d, to be compatible, as each of the microprocessors 54a–54d thinks that it has complete control of the transmitter 38 during a call completed with the telephone corresponding to the particular microprocessor.

FIG. 3 shows the components of the composite power adjust section 34 in more detail. As shown, the baseband transmit signal combiner 60 includes channel gain adjusters realized by, for example, opamp difference amplifiers, and including respective gain adjust sections 70a–70d and amplifier sections 72a–72d. The gain adjust sections 70a–70d are for receiving the generated composite gain signal from the gain adjust averager 62, as well as channel IF gain signals from the respective microprocessors 54a–54d, and for calculating difference signals 74a–74d indicative of differences between the composite gain signal 48 and each of the respective individual channel IF gain signals 58a–58d to set the gain of the amplifier sections 72a–72d. The gain adjust sections 70a–70d are also for receiving a DC voltage corresponding to 0 dB gain for biasing the respective amplifier sections 72a–72d.

The amplifier sections 72a–72d are for amplifying or attenuating the respective channel baseband transmit signals 56a–56d, which are formed from separate quadrature baseband I and Q signals. Signal summers 78a and 78b are for receiving the respective amplified/attenuated baseband I and Q signals from the amplifier sections 72a–72d, and for generating respective composite I and Q transmit signals 46a, 46b from the I and Q signals from each of the individual channels. The resulting composite transmit I and Q signals 46a and 46b are then output to the transmitter 38.

Operation of the composite gain adjust section 34 will now be described with reference to FIGS. 2 and 3. If the FWT 14 is supporting two calls on, for example, telephones 12a and 12b, and the base station 14 is instructing the call on the telephone 12a to increase its transmit power, and the call on the telephone 12b to decrease its power, both power control requests cannot be simultaneously satisfied without the composite gain adjust section 34 of the preferred embodiment because the transmit path for both calls is through the same RF section 30, and because the transmit power level adjustment is executed by the transmitter 38 in the RF section. The composite gain adjust section 34 facilitates independent channel power level adjustment by creating, at the transmit baseband signal combiner 60, the composite baseband transmit signal 46, which is composed of each of the individual baseband transmit channel signals 56a–56d (one for each active call) summed in a manner that adjusts the levels of each of the individual baseband transmit channel signals to the proper level relative to the other baseband transmit channel signals. The composite gain adjust section 34 can therefore pass the single composite baseband transmit signal 46 to the transmitter 38 while still enabling the transmitter 38 to independently adjust channel power levels.

The RF section 30 transmits the composite baseband transmit signal 46 at a power level that is an average of all requested individual call levels. While the gain setting corresponding to the average power level may not be correct for any of the individual channels, the baseband level of each of the individual channels is adjusted prior to the transmit baseband combiner 60 combining the baseband transmit signals 56a–56d so that each individual call is transmitted at its correct power level. The baseband signal levels are adjusted in such a manner because it is desirable to maintain the signal levels at baseband as high as possible to maintain a high signal to noise ratio, and to enable as much power adjustment and attenuation as possible to be performed at IF and RF frequencies within the transmitter 38.

Operation of the composite gain adjust section 34 will now be further illustrated by way of the following example. If the multi-line FWT 14 is supporting four active calls, with the base station 22 instructing three of the calls to transmit at a power level of 10 dBm, and the fourth call at a power level of 14 dBm, the average transmit level desired, $P_{avg}$, is:

$$P_{avg} = (10+10+10+14)/4 = 11 \text{ dBm}$$

Therefore, the gain of the transmitter 38 will be adjusted to a power level of 11 dBm for each channel. However, the composite gain adjust section 34 is designed so that the level of each of the individual channels is adjusted by the gain adjust sections 70a–70d of the opamp difference amplifiers by taking the difference between the desired channel gain and the composite gain:

Ind. gain for channel N=(gain for desired channel $P_{out}$)−(gain for $P_{avg}$=11 dBm)

For the first three calls, the gain required to achieve an output power level of 11 dBm would be the gain of the first three calls set as follows:

Ind. gain for ch. 1=(gain for ch. 1 $P_{out}$=10 dBm)−(gain for $P_{avg}$=11 dBm)=−11 dBm Therefore, while the appropriate gain $P_{out}$ for channel 1 is 10 dBm, the composite gain adjust section 34 determines that the level of the individual baseband signal 56a needs to be reduced by 1 dB prior to the baseband transmit signal combiner 60 combining all of the baseband transmit signals 56a–56d. This is because the gain of the transmitter 38 will be 1 dB too high, as the transmitter gain will be adjusted for $P_{avg}$=11 dBm. The baseband levels for each of the individual baseband transmit signals 56b–56d for channels 2–4 are similarly adjusted by the composite gain adjust section 34 as follows:

Ind. gain for ch. 2=(gain for ch. 2 $P_{out}$=10 dBm)−(gain for $P_{avg}$=11 dBm)=−1 dB Ind. gain for ch. 3=(gain for ch. 3 $P_{out}$=10 dBm)−(gain for $P_{avg}$=1 dBm)=−11 dB Ind. gain for ch. 4=(gain for ch. 4 $P_{out}$=14 dBm)−(gain for $P_{avg}$=11 dBm)=+3dB For each of the channels, the desired individual output power equals the sum of $P_{avg}$ and the individual gain for that channel:

Power out for ch. 1=11 dBm+(−1 dBm)=10 dBm

Power out for ch. 2=11 dBm+(−1 dBm)=10 dBm

Power out for ch. 3=11 dBm+(−1 dBm)=10 dBm

Power out for ch. 4=11 dBm+(+3 dBm)=14 dBm

Therefore, individual gain control is maintained while enabling a single transmitter to be implemented in a multi-channel FWT. As a result, the footprint of the FWT is reduced. In addition, the overall manufacturing cost of the FWT is reduced, as only a single transmitter is required.

While the above-discussed composite gain adjuster is a preferred embodiment in accordance with the present invention, the power adjuster can also be configured to determine the maximum desired power level of each individual call and to use the maximum desired power level to set the gain for the multi-line FWT. Such a configuration may be useful, for example, if the individual channel voltage controlled amplifiers were only capable of attenuation and could not boost signal levels.

Referring to FIG. 4, the power adjuster could be alternatively configured to enable two independent gain averagers 62a, 62b, the former being for IF gain adjustment and the latter being for RF gain adjustment, to replace the single IF gain averager 62 in the embodiment shown in FIGS. 2 and 3 and described above. Such a configuration could be applied in, for example, a CDMA-based system in which the subscriber unit or FWT must be capable of adjusting its transmit power over a wide range of output levels, such as a 75 dB range for IS-95 protocol. Because such a wide gain variation is difficult to achieve in a single variable attenuator, the individual IF and RF gain adjusters 62a, 62b may be implemented as a result. The FIG. 4 block diagram shows an alternative embodiment including the separate gain adjusters 62a, 62b for receiving respective IF and RF gain signals 80a–80d and 82a–82d, and for generating separate composite IF and RF gain adjust signals 84a and 84b input both directly to the transmitter 38 and also to the gain adjust sections 70a–70d. All other components are identical to those in the embodiment shown in FIG. 3.

In view of the foregoing discussion, it should be appreciated that the composite power adjuster of the above-discussed embodiment in accordance with the present invention enables each channel microprocessor in a multi-line FWT with only a single transmitter to think that it is in complete control of the transmitter by facilitating compatibility among channel software microprocessors. In addition, the composite software adjuster of the above-discussed embodiment in accordance with the present invention can be fully implemented using hardware components, and therefore does not require DSP or microprocessor intervention to achieve closed loop power control for multiple channel units.

While the above description is of the preferred embodiment of the present invention, it should be appreciated that the invention may be modified, altered, or varied without deviating from the scope and fair meaning of the following claims.

What is claimed is:

1. A method of combining multiple transmit signals while maintaining independent power control over each of the multiple transmit signals, comprising:

receiving gain control signals based on base station power commands for each of a plurality of signal transmission lines;

receiving respective transmit signals from the plurality of signal transmission lines;

averaging the gain control signals for the plurality of signal transmission lines; and using an average gain control signal generated during the averaging of gain control signals to set transmit gains for each of the plurality of signal transmission lines.

2. The method of claim 1, wherein the using of an average gain control signal comprises:

determining differences between the respective gain control signals for the plurality of signal transmission lines and the average gain control signal to generate respective differential gain control signals for the plurality of signal transmission lines; and setting the transmit gains for each of the plurality of signal transmission lines based on the respective differential gain control signals.

3. The method of claim 1, wherein the receiving of power control signals comprises receiving first and second power control signals based on base station power commands for each of the plurality of signal transmission lines.

4. The method of claim 3, wherein the receiving of first and second power control signals comprises receiving IF and RF control signals for each of the plurality of signal transmission lines.

5. The method of claim 4, further comprising:

averaging respective IF control signals for the plurality of signal transmission lines to generate an average IF control signal;

averaging respective RF control signals for the plurality of signal transmission lines to generate an average RF control signal;

determining differences between the respective IF control signals for the plurality of signal transmission lines and the average IF control signal to generate respective differential IF control signals for the plurality of signal transmission lines;

determining differences between the respective RF control signals for the plurality of signal transmission lines and the average RF control signal to generate respective differential RF control signals for the plurality of signal transmission lines; and setting the respective transmit gains for the plurality of signal transmission lines based on the respective differential IF and RF control signals.

6. The method of claim 5, further comprising:

combining signals transmitted over each of the plurality of signal transmission lines after the setting of the respective transmit gains for the plurality of signal transmission lines based on the respective differential gain control signals.

7. The method of claim 6, wherein the combining of the signals transmitted over each of the plurality of signal transmission lines comprises:

combining I transmit signals transmitted over each of the plurality of signal transmission lines; and combining Q transmit signals transmitted over each of the plurality of signal transmission lines.

8. The method of claim 1, further comprising using the average gain control signal to set an RF transmit gain.

9. A gain controller for a multi-channel fixed wireless terminal, comprising:

an averager for receiving and averaging gain control signals for each of multiple transmission channels to generate an average gain control signal;

a plurality of differentiators for generating respective differential gain control signals for the multiple transmission channels from the respective gain control signals for the multiple transmission channels and the average gain control signal; and a plurality of adjustable amplifiers controlled by the respective plurality of differentiators for amplifying signals transmitted over the multiple transmission channels and input thereto to maximize respective signal to noise ratios of the signals transmitted over the multiple transmission channels.

10. The gain controller of claim 9, wherein the gain control signals for each of the multiple transmission channels comprise an RF control signal and a IF control signal.

11. The gain controller of claim 9, wherein the averager is further for:

averaging respective IF control signals for the multiple transmission channels to generate an average IF control signal; and averaging respective RF control signals for the multiple transmission channels to generate an average RF control signal.

12. The gain controller of claim 11, wherein each of the plurality of differentiators is further for:

determining a difference between a respective IF control signal and the average IF control signal to generate a differential IF control signal; and determining a difference between a respective RF control signal and the average RF control signal to generate a differential RF control signal.

13. The gain controller of claim 12, wherein each of the plurality of adjustable amplifiers has a transmit gain set based on corresponding differential IF and RF control signals.

14. The gain controller of claim 9, further comprising a summer for combining signals transmitted over each of the multiple transmission channels after the plurality of adjustable gain stages set the respective transmit gains for each of the respective multiple transmission channels.

15. The gain controller of claim 14, wherein the combiner is further for combining I transmit signals transmitted over each of the multiple transmission channels, and for combining Q transmit signals transmitted over each of the multiple transmission channels.

16. A multi-channel fixed wireless terminal, comprising:

a plurality of control sections each for processing transmit, receive and gain control signals for a corresponding one of a plurality of channels;

a single RF transceiver for receiving the receive and gain control signals processed by the plurality of control sections, and for transmitting the transmit signals processed by the plurality of control sections; and a gain controller connected between the plurality of control sections and the RF transceiver and including:

an averager for receiving and averaging gain control signals for each of the plurality of channels to generate an average gain control signal;

a plurality of differentiators for generating respective differential gain control signals for the plurality of channels from the respective gain control signals for the plurality of channels and the average gain control signal; and a plurality of adjustable amplifiers controlled by the respective plurality of differentiators for amplifying signals transmitted over the plurality of channels and input thereto to maximize respective signal to noise ratios of the signals transmitted over the plurality of channels.

* * * * *